Oct. 21, 1941.    R. H. HARRIS    2,259,691
MERRY-GO-ROUND
Filed Nov. 25, 1940    5 Sheets-Sheet 1

Richard H. Harris,
INVENTOR
BY Victor J. Evans & Co.
ATTORNEYS

Oct. 21, 1941.  R. H. HARRIS  2,259,691
MERRY-GO-ROUND
Filed Nov. 25, 1940  5 Sheets-Sheet 2

Richard H. Harris, INVENTOR
BY Victor J. Evans & Co.
ATTORNEYS

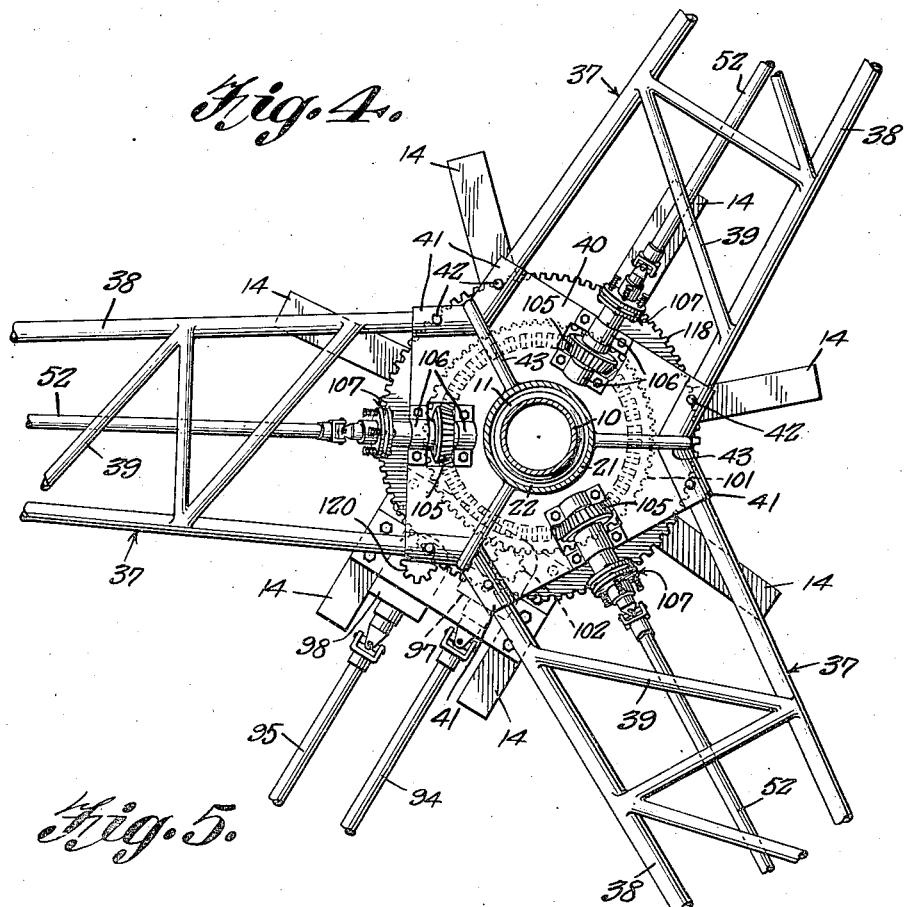
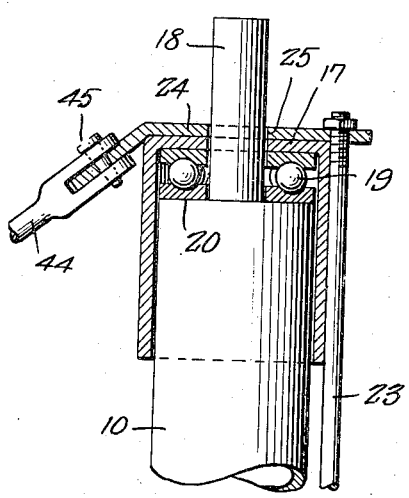
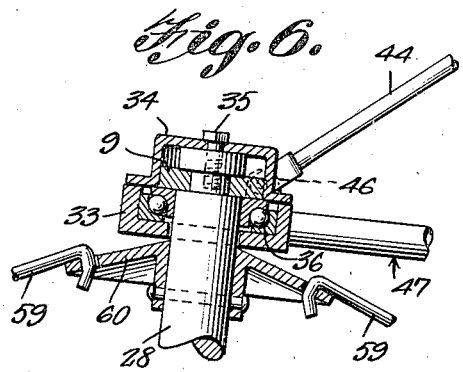

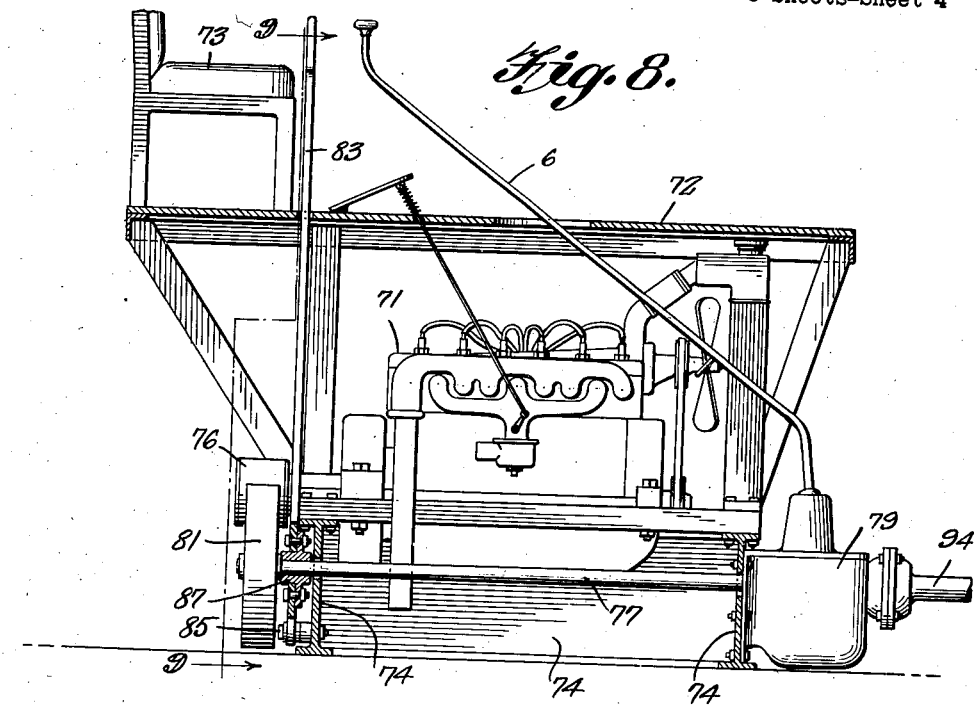
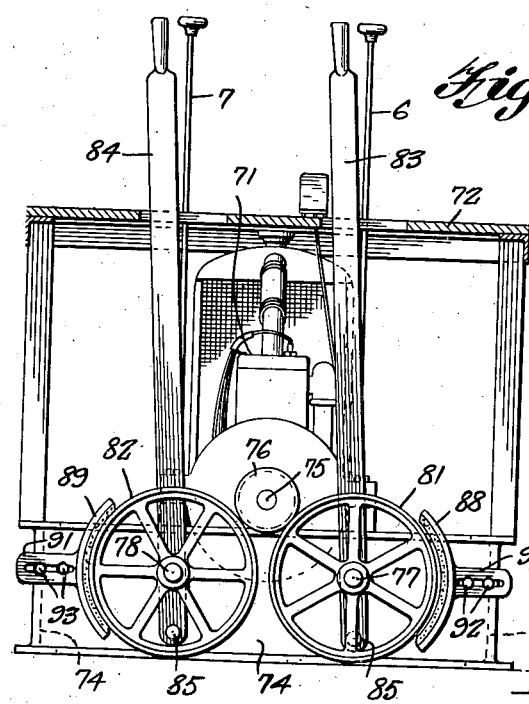
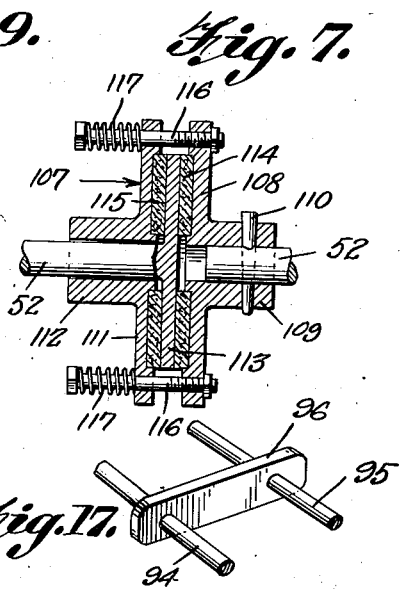

Oct. 21, 1941.  R. H. HARRIS  2,259,691
MERRY-GO-ROUND
Filed Nov. 25, 1940  5 Sheets-Sheet 5

Fig. 10.

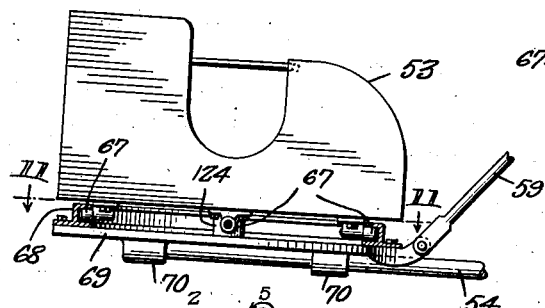

Fig. 11.

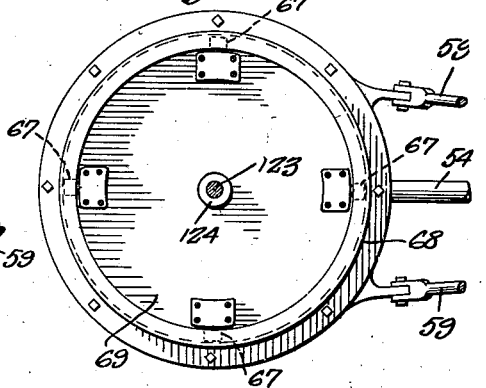

Fig. 12.

SEAT SHAFT TURNING RELATIVELY FAST AND IN OPPOSITE DIRECTION TO THAT OF POLE

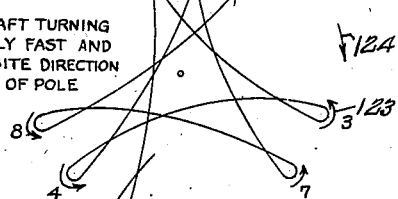

Fig. 13.

SEAT SHAFT TURNING SLOWER AND IN OPPOSITE DIRECTION TO POLE

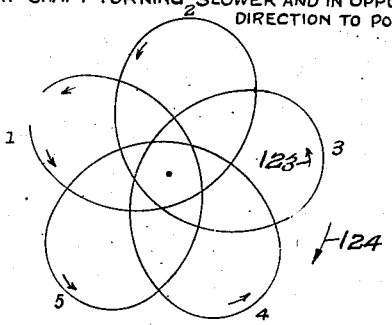

Fig. 14.

SEAT SHAFT TURNING AT A SPEED APPROXIMATELY MIDWAY OF FIGS. 12 & 13. POLE ROTATING IN OPPOSITE DIRECTION.

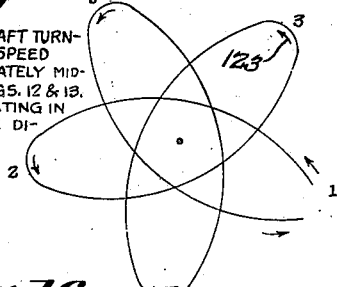

Fig. 15. SEAT SHAFT ROTATING SLOWLY IN RELATION TO AND IN THE SAME DIRECTION AS POLE.

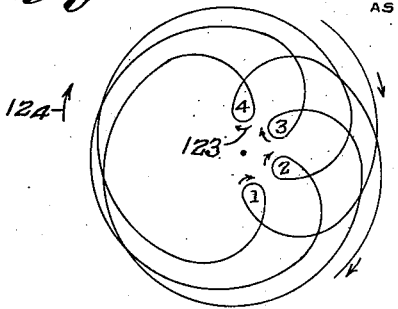

Fig. 16.

SEAT SHAFT ROTATING FASTER THAN IN FIG. 15 AND IN SAME DIRECTION AS POLE

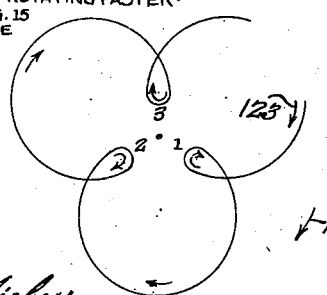

Richard H. Harris,
INVENTOR

BY Victor J. Evans & Co.
ATTORNEYS

WITNESS

Patented Oct. 21, 1941

2,259,691

UNITED STATES PATENT OFFICE 2,259,691

MERRY-GO-ROUND

Richard H. Harris, Hapeville, Ga.

Application November 25, 1940, Serial No. 367,119

8 Claims. (Cl. 272—37)

This invention relates to merry go rounds of the whip type in which the seats travel in serpentine paths, thus giving a waltzing or "scrambled" sensation or thrill to the passengers while promoting an elusive, interesting spectacle to spectators.

An object of the invention is to provide an amusement device of this character in which there are three annular seat units arranged in the form of a triangle around a center pole, each seat unit preferably comprising four passenger seats arranged at an angular distance of 90° from each other, and having its own axis of rotation, all of the seat units being rotated in a planetary path around a central axis of rotation, three seat units arranged in the form of a triangle being found in actual practice to better balance the device than a greater or less number of seat units.

A further object is to provide in an amusement device of this character, an axis of rotation for the individual seat units canted inwardly toward the pole, and having the individual seats of each unit canted inwardly toward said axis of rotation, so that centrifugal force and gravity will balance each other when the machine is in motion and promote smooth operation and more particularly to give the passengers a sensation of stability, rather than one of being hurled from the seat.

A further object is to provide a device of this character having friction clutches forming slip connections in the drive shafts of the seat units to prevent stripping of the driving gears and twisting off of the shafts, ordinarily caused by the whipping action produced when a seat unit is unbalanced, as for example, when one seat in the seat unit is occupied while the other seats are vacant.

A further object is to provide in a device of this character, a single set of ball bearings at the top of the center pole for supporting the entire rotating structure.

A further object is to provide a device of this character having a rotating tube carried by the top bearing and sleeved on the center pole, the tube carrying all of the rotating structure and being reinforced against side sway by a cylindrical bearing formed at the bottom of the pole.

A further object is to provide in a device of this character, motion transmitting means actuated by a conventional internal combustion engine and controlled manually to effect variations in both forward and reverse speeds of the main central axis of rotation, and the individual axes of rotation of the seat units, in order to cause the seats to travel a great variety of different ellipsoidal and cusp paths.

A further object is to provide a device of this character having a loading platform of annular contour for each seat unit, a central platform accessible to the seat unit platforms, and ramps leading to the central platform.

A further object is to provide in a device of this character, a friction drive and brake at the engine for operating the driving shafts for the central axis of rotation and the axes of rotation of the seat units, to absorb shocks and jars, eliminate breakage and to facilitate changes in speed and direction of the seats being gradually accomplished to promote safety.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 4 is a cross sectional view taken on the line 4—4 of Figure 3.

Figure 5 is a cross sectional view taken on the line 5—5 of Figure 1, drawn to an enlarged scale to show the ball bearings at the top of the center pole upon which the weight of the apparatus is supported.

Figure 6 is a detail cross sectional view taken on the line 6—6 of Figure 1, showing the ball bearings at the top of a seat unit shaft.

Figure 7 is a detail cross sectional view showing one of the friction clutches.

Figure 8 is a sectional view showing the platform, remote control operator's seat, internal combustion engine, and controls therefor for actuating the amusement device.

Figure 9 is a vertical sectional view taken on the line 9—9 of Figure 8, showing the brakes and friction drive for the motion transmitting mechanism of the amusement device.

Figure 10 is a side elevation, with parts in section, showing one of the seats.

Figure 11 is a cross sectional view taken on the line 11—11 of Figure 10.

Figures 12 to 16, inclusive are diagrams illustrating a few of the vast number of respectively different paths of travel of a single seat.

Figure 17 is a detail perspective view showing a spacing element for two of the main driving shafts.

Figure 3:
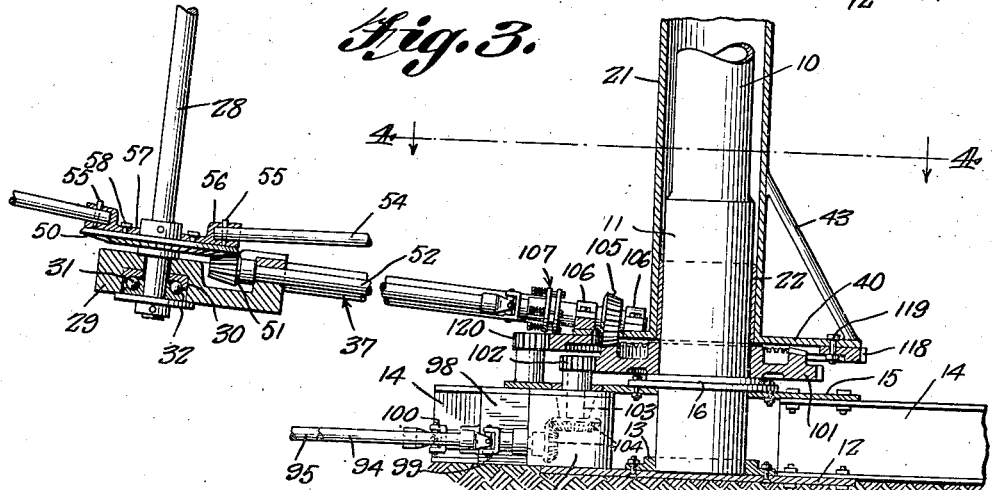
Figure 3 is a vertical sectional view, with parts broken away, and drawn to an enlarged scale, showing the central axis of rotation for all of the seat units and one axis of rotation for an individual seat unit, and the driving means for each.

Referring now to the drawings in which like characters of reference designate similar parts in the various views, 10 designates a tubular center pole which is uniformly enlarged at the lower end to form a bearing 11, and at the extreme bottom is supported upon a lower base plate 12 through the medium of a clamp ring 13 which is bolted to the base plate, as shown in Figure 3. For anchoring the pole stationary in vertical position, a plurality of I beams 14 are bolted to the lower base plate 12 and to an upper base plate 15, the pole being also secured to the upper base plate by a clamp ring 16 which surrounds the pole and is bolted to the upper base plate. The I beams extend radially along the ground and prevent tipping over of the pole.

As best shown in Figure 5, the upper end of the pole is provided with a cylindrical housing 17, the skirt of which loosely receives the top of the pole, and the closed top of which loosely receives a reduced extension 18 which projects from the top of the pole. Ball bearings 19 are interposed between the top of the housing and a shoulder 20 formed on the pole at the base of the projection 18 and form thrust bearings as well as promote anti-friction turning of the housing on the top of the pole.

A tube 21 is sleeved upon the pole and a bushing 22 is interposed between the bottom of the tube and the bearing 11 of the pole to prevent side sway of the tube. The tube is suspended from the top of the pole through the medium of rods 23 which are connected at the top to a cap plate 24, best shown in Figure 5, which is provided with an opening 25 to receive the extensions 18 of the pole and permit the cap plate being supported upon the closed top of the housing 17. The lower ends of the rods are connected to a flange 26 which extends outwardly from the top of the tube and which is braced by inclined braces 27. The tube, the rods, and the cap plate turn as a unit on the center pole and form a center axis of rotation for the seat units.

Figure 1:
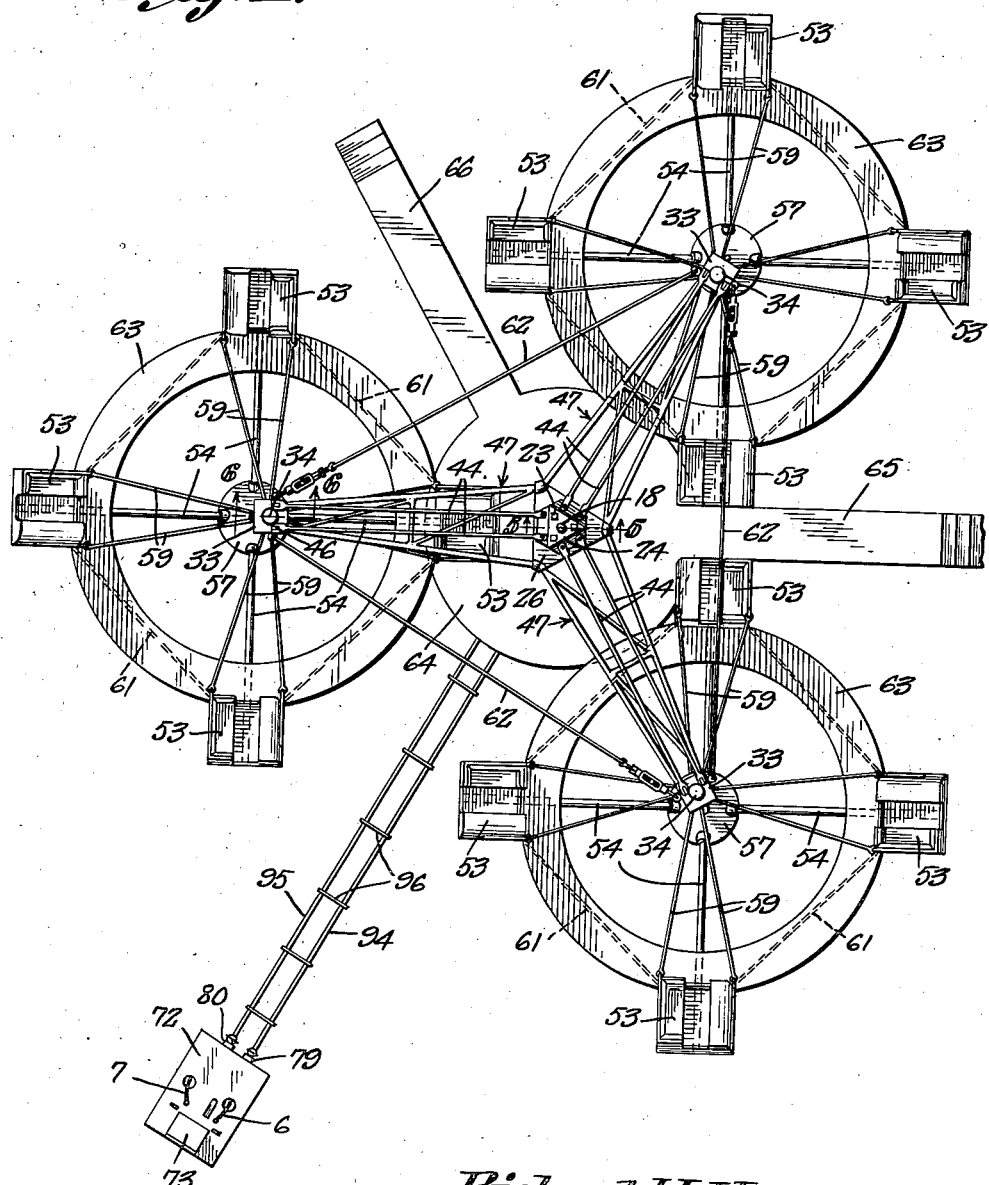
Figure 1 is a plan view of a merry go round of the whip or waltzing type, constructed in accordance with the invention.

As best shown in Figure 1, there are three seat units equally spaced from each other and from the center pole and arranged in the form of a triangle with the center pole at the center thereof to properly balance the device.

Each seat unit comprises a shaft 28 which is journalled in a bearing plate 29 having a recess 30 formed in the bottom to receive ball bearings 31, which latter are held in place by a flange 32 on the shaft engaging the bottom of the bearing plate, as best shown in Figure 3. The shaft extends upwardly and is canted, or inclined inwardly, toward the pole 10. As best shown in Figure 6, the top of the shaft is rotatably mounted in a two-piece housing comprising a cup section 33 which surrounds the shaft, and cap section 34 which is secured to the upper end of the shaft by a screw 35 or other connector, and which coacts with a retainer disk 9 carried by the shaft, to retain ball bearings 36 in the cup section.

The bearing plate 29 at the bottom of the shaft is carried by a skeleton arm 37, best shown in Figure 4, formed of spaced longitudinal rods or tubing 38 connected by the transverse braces 39. The rods of the skeleton arm are connected at the inner ends to a plate 40 which is fixed to the bottom of the tube 21, preferably the arms being engaged in tubular sockets 41 carried by the plate and secured therein by tapered pins 42. Inclined braces 43 extend from the tube to the plate to reinforce the plate against distortion.

Figure 2:
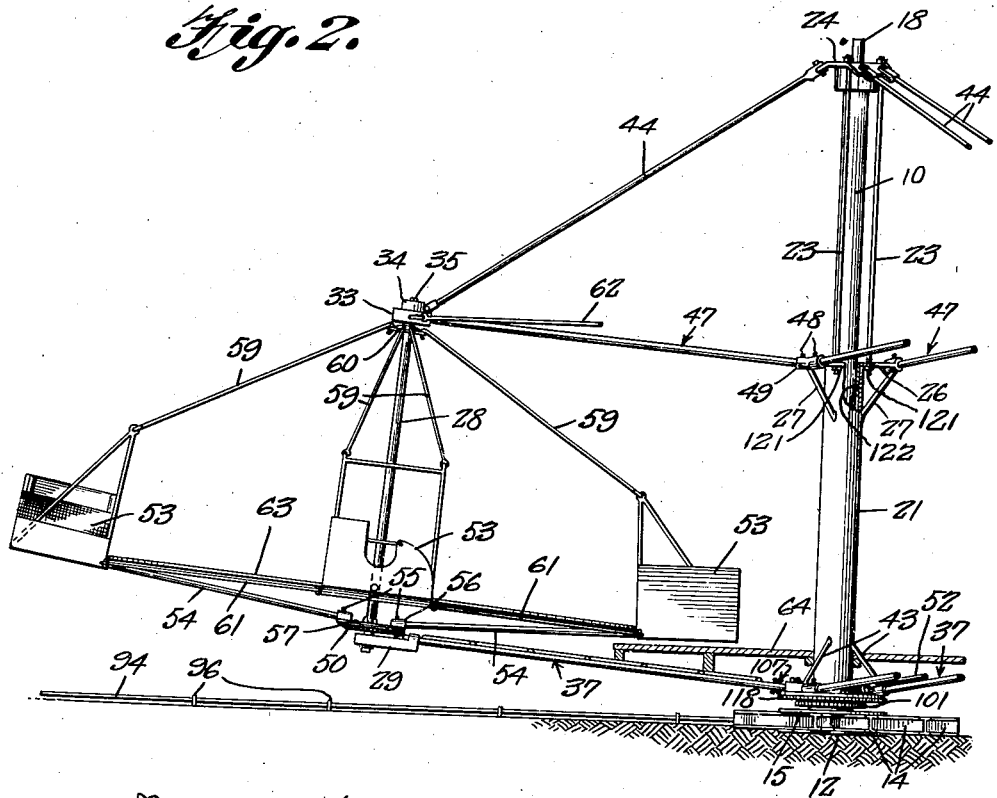
Figure 2 is a side elevation, with parts in section, of a portion of the amusement device showing one of the seat units, and the parts associated with the center pole.

The two piece housing for the top of the shaft is rigidly secured to the cap plate 24 by downwardly inclined suspension rods 44, best shown in Figures 1 and 2, which are connected to the cap plate by tapered pins 45, or other connectors, as best shown in Figure 5. The lower ends of the rods are connected to the cap section 34 by pins 46, best shown in Figure 6. A skeleton arm 47, similar to the skeleton arm 37, above described, but of lighter construction, is secured in any preferred manner, to the cup section 33 of the housing and at the inner end is secured by tapered pins 48 or other connectors in sockets 49 carried by the flange 26 at the upper end of the tube 21, as shown in Figures 1 and 2.

It will be observed that the shaft 28 is supported at the top by the two piece bearing, which bearing is suspended from the cap plate 24 which rests upon the ball bearings 19 at the top of the pole 10. It will be also pointed out that the bearing plate 29 in which the bottom of the shaft 28 is rotatably mounted, is in reality supported by the shaft 28 and is spaced from and connected to the tube 21 by the skeleton arm 37. Thus, the seat unit is suspended in its entirety from the top of the pole 10 and turns as a unit with the tube 21, as will presently be explained, in a planetary path around the center pole 10.

As best shown in Figure 3, a bevel gear 50 is secured to the lower end of the shaft 28 and meshes with a bevel pinion 51 carried by an operating shaft 52 which is journalled in the bearing plate and is rotated, as will be presently described, to rotate the shaft 28. Preferably four seats 53 are secured at the outer ends of respective supporting rods 54, which extend in a radial direction toward the bottom of the shaft 28 and are secured by tapered pins 55 in sockets 56 carried by a plate 57 which is fixed to the top face of the bevel gear by set screws 58. The seats are spaced an angular distance of 90° apart and are canted, or inclined toward the shaft 28 which forms the axis of rotation for the seats.

Each seat is braced by a pair of downwardly inclined brace rods 59 which are connected at the other ends to a conical disk 60, which is secured to the shaft 28 underneath the two piece bearing housing, as best shown in Figure 6. The lower ends of the brace rods are connected to the seats in any preferred manner. The seats are held spaced an equal distance apart by guy rods 61 which extend from seat to seat, as best shown in Figure 1. As also shown in this figure, the seat units themselves are maintained equally spaced apart by guy rods 62 which extend from the two piece housing at the top of one shaft 28 to the two piece housing of the next adjacent shaft 28.

An annular platform 63 is disposed concentric with the shaft 28 of each seat unit and is supported upon the guy rods 61 to facilitate the passengers entering and leaving the seats. A central platform 64 is disposed about the tube 21 to provide access for the passengers to the annular platforms of the seat units. An entrance ramp 65 extends to the central platform from one side of the device, and an exit ramp 66 extends to the central platform from another side of the device.

Each seat may be rigidly mounted on the supporting rod 54. However, if desired, as shown in Figures 10 and 11, the seat may be provided with rollers 67 which are received in an annular track 68, which is secured to a plate 69 having socket members 70 which receive the rod 54. The advantage of the rollers and track is that the seat can also rotate on its supporting arm to cushion the occupant against shocks and jars due to a change of speed or direction of the seat unit.

For rotating the seat units on their individual axes of rotation and at the same time rotating the seat units in a planetary path around the center pole, an internal combustion engine 71 is located a short distance from the amusement device and is disposed underneath a platform 72, upon which is mounted an operator's seat 73. The engine is supported upon a box-like frame formed of I beams 74. The shaft 75 of the engine is equipped with a driving pulley 76, best shown in Figures 8 and 9. A pair of primary drive shafts 77 and 78 extend loosely through openings in the front and rear I beams and at the front ends are connected to respective conventional motor vehicle transmissions 79 and 80, shown in Figure 1, which are bolted to the front I beams, and are controlled by gear shift levers 6 and 7. The rear ends of the primary drive shafts are equipped with respective friction wheels 81 and 82 adapted to engage the driving pulley 76 and be driven thereby to rotate the primary drive shafts.

Respective control levers 83 and 84 are pivoted at the lower ends, as shown at 85 and 86, in Figure 9, to the rear I beam and are provided with respective bearing hubs 87, one of which is shown in Figure 8, to receive the primary drive shafts. When the operator shifts either of the levers 83 or 84 toward the driving pulley and holds it there, the respective friction wheel 81 will engage the driving pulley and be driven thereby, the respective shaft 77 fitting the respective openings in the I beams loosely enough to permit this shifting movement.

A pair of arcuate brake shoes 88 and 89 are provided with respective longitudinally slotted arms 90 and 91, through which adjusting bolts 92 and 93 are engaged and secured to the rear I beam. When the levers 83 and 84 are moved toward the brake shoes, the friction wheels 81 and 82 will engage the brake shoes so that rotation of the primary drive shafts will be slowed down and then stopped.

Two main driving shafts 94 and 95, shown in Figures 1, 2 and 3, are connected at the rear ends to the respective transmissions 79 and 80 and are supported in parallel spaced relation by apertured bars 96 which are placed upon the ground, one of these bars being shown in Figure 17. The front end of the shaft 94 enters a gear case 97, best shown in Figure 3, and the front end of the shaft 95 enters a gear case 98, the shafts being equipped with respective knuckle joints 99 and 100 near their gear cases. The gear cases are mounted between the upper and lower base plates 12 and 15, as best shown in Figure 3.

A gear 101 is mounted loose on the bearing 11 of the center pole 10 and is supported upon the clamp ring 16. The gear has peripheral gear teeth which mesh with a pinion 102 mounted on a stub shaft 103, which enters the gear case 97 and is connected to the main drive shaft 94 by meshing bevel gears 104. The gear 101 is also provided with gear teeth on the top face, which mesh with a pinion 105 carried by the inner end of each of the three operating shafts 52 of the seat units, said inner end of the operating shaft being secured to the plate 40, which revolves as a unit with the tube 21, by spaced bearings 106. When the lever 83 is shifted by the operator to bring the friction wheel 81 into driving engagement with the pulley 76, the gear 101 will be rotated and rotate the shaft 28 of each seat unit through the shaft 52, pinion 51 and pinion 105 of the respective unit. The transmission 79 permits the seat units to be rotated at least three different forward speeds and one reverse speed.

To prevent stripping of the driving gears and twisting off of the shafts, the operating shaft 52 of each seat unit is provided with a friction clutch 107, best shown in Figure 7. The shaft 52 is severed transversely adjacent to the pinion 105. A clutch disk 108 is provided with a hub 109 which is secured to one of the sections by a tapered pin 110. A clutch disk 111 is provided with a hub 112 which is loose on the other section of the shaft, and the last named section is provided with a disk head 113 integral therewith disposed between both clutch disks. Both clutch disks are recesses on their inner faces to loosely receive respective friction rings 114 and 115 which engage opposite faces of the disk head 113. Elongated bolts 116 are engaged through the clutch disks and helical compression springs 117 are sleeved on the bolts and bear against the clutch disk 111 to yieldably hold the friction rings 114—115 in driving engagement with the disk head 113.

When a seat unit is unbalanced, as for example, when one seat in the unit is occupied while the other seats are vacant, a whipping action is produced by change of speed and direction, and when this occurs the friction clutch of the unit will slip sufficiently to prevent stripping of the gears and twisting off of the shafts forming the driving medium of the unit.

For rotating the tube 21 to move all of the seat units in a planetary path around the center pole as an axis of rotation, a gear 118 is bolted to the plate 40, as shown at 119. The gear has peripheral gear teeth which mesh with a pinion 120 carried by a stub shaft which enters the gear case 98 and is geared to the driving shaft 95 which extends to the transmission 80.

The tube 21 is adjustably hung from the cap plate 24 at the top of the pole by the rods 23 which have nuts 121 bearing on the underside of the flange 26, which nuts may be adjusted to raise or lower the flange to correspondingly raise or lower the tube and cause the pinions 105 to properly mesh with the gear 101 on the pole. This adjustment also provides a means for making necessary adjustments from time to time to compensate for wear.

A bushing 122 is interposed between the upper end of the tube 21 and the pole 10, similar to the bushing 22 at the bottom of the pole. This bushing transfers the great thrust load to the pole 10, imposed upon the skeleton arms 47, due to the angularity of the suspension rods 44, when a load is put on the shafts 28.

In operation, a wide combination of relative speeds of the seat units turning on their own individual axis and of the group of seat units turning on the center pole as an axis of rotation, is obtainable by manipulation of the levers 83—84 and transmission levers 6 and 7. Variation of speed and direction accomplishes a wide variety of paths which a seat travels with respect to the center pole. Figures 12 to 16 illustrate five different paths and since the diagrams display legends indicating the speed conditions existing at the time a seat in traveling a particular path indicated by the arrows 123, making from one to three or more turns around the center pole rotating in the direction indicated by the arrows 124, it is thought unnecessary to repeat the legends, it being sufficient to explain that each seat may be caused to travel a large number of different ellipsoidal paths and cusp paths, as well as combinations of both these types of curved paths. In addition each individual seat 53 may rotate on its own axis formed by a pivot pin 123 carried by the seat and engaged in a socket member 124 carried by the base plate 69 of the seat.

From the above description it is thought that the construction and operation of the invention will be fully understood without further explanation.

What is claimed is:

1. In a merry go round of the whip type, a stationary center pole, a tube loose on the pole, means having antifriction connection with the top of the pole suspending the tube on the pole, a plurality of seat unit shafts spaced equi-distant laterally of the pole, means having antifriction connection with the top of the shafts suspending the shafts from the tube for planetary movement in upright position around the pole, means connecting the seat unit shafts at the bottom to the tube, a plurality of seats in each unit spaced at an angular distance of about 90° apart supported from the bottom of the respective seat unit shaft, the seats being movable in a circular path around the seat unit shaft when the shaft is rotated axially, means for rotating the seat unit shafts as a unit at various selected forward and reverse speeds, and means for rotating the tube at various forward and reverse speeds.

2. The structure as of claim 1 and in which the seat unit shafts are canted inwardly toward the pole and the seats of each seat unit are canted inwardly toward the respective seat unit shaft so that centrifugal force and gravity will balance each other when the machine is in motion and promote smooth operation as well as give the passengers a sensation of stability.

3. The structure as of claim 1 and in which in the next to the last named means friction clutches are incorporated to provide slip connections to prevent stripping and twisting off of members of the means.

4. In a merry go round, a stationary center pole, a tube loose on the pole, means suspending the tube from the top of the pole, seat unit shafts spaced laterally from the pole in upright position, means suspending the shafts from the top of the center pole and from the tube to rotate in a planetary path around the center pole, a plurality of seats in each seat unit supported from the bottom of the respective seat unit shaft, said seats being movable in a circular path around the seat unit shaft when the shaft is rotated axially, respective motion transmitting shafts geared to the seat unit shafts, a gear loose on the pole, pinions on the motion transmitting shafts meshing with said gear, friction clutches forming slip connections in the transmitting shafts, a gear fixed to the tube, respective driving shafts geared to said gears for rotating the seat unit shafts axially and for rotating the tube axially, an internal combustion engine, automotive vehicle transmissions connected to respective driving shafts, and friction drive means connecting the engine to both transmissions.

5. The structure as of claim 4 and in which said seats each includes a supporting plate, a pivot pin carried by the seat, a socket member carried by the plate, a circular track on the plate concentric with the pivot pin, and rollers on the bottom of the seat engaging the circular track, each individual seat being rotatable on its own axis formed by the pivot pin and the socket member.

6. In a merry go round, a stationary center pole, a tube loose on the pole, means suspending the tube from the top of the pole, seat unit shafts spaced laterally from the pole in upright position, means suspending the shafts from the top of the center pole and from the tube to rotate in a planetary path around the center pole, a plurality of seats in each seat unit supported from the bottom of a respective seat unit shaft, said seats being movable in a circular path around the seat unit shaft when the shaft is rotated axially, means for rotating the seat unit shafts axially, means for rotating the tube axially, means for controlling the speed of the shafts and the tube in a forward and in a reverse direction relative to each other for causing the individual seats of the seat units to travel in a great variety of different ellipsoidal and cusp paths, and means for effecting access to and exit from the seats of each seat unit.

7. The structure as of claim 6 and in which the last named means comprises a loading platform of annular contour for each seat unit concentric with the axis of rotation of the seat unit, a central platform at the bottom of the center pole accessible to the seat unit platforms, and ramps leading to the center platform.

8. In a merry go round, a stationary center pole having an enlarged lower end forming a bearing, a tube rotatably mounted on the bearing and held against side sway by the bearing, means suspending the tube from the top of the pole, seat unit shafts spaced laterally from the pole in upright position, means suspending the shafts from the top of the center pole and from the tube to rotate in a planetary path around the center pole, a plurality of seats forming each seat unit supported from the bottom of a respective seat unit shaft and movable in a circular path around the seat unit shaft when the shaft is rotated axially, means for rotating the seat unit shafts axially, means for rotating the tube axially, and means for controlling the speed of the shafts and the tube in a forward and in a reverse direction relative to each other for causing the individual seats of the seat units to travel in a great variety of different ellipsoidal and cusp paths.

RICHARD H. HARRIS.